US 7,165,177 B2

(12) United States Patent
Gilbert et al.

(10) Patent No.: US 7,165,177 B2
(45) Date of Patent: Jan. 16, 2007

(54) METHOD OF PROTECTING AN ELECTRONIC CHIP AGAINST FRAUD

(75) Inventors: Henri Gilbert, Bures sur Yvette (FR); Marc Girault, Caen (FR)

(73) Assignee: France Telecom, Paris (FR)

( * ) Notice: Subject to any disclaimer, the term of this patent is extended or adjusted under 35 U.S.C. 154(b) by 550 days.

(21) Appl. No.: 10/221,693

(22) PCT Filed: Mar. 19, 2001

(86) PCT No.: PCT/FR01/00810

§ 371 (c)(1),
(2), (4) Date: Feb. 26, 2003

(87) PCT Pub. No.: WO01/75821

PCT Pub. Date: Oct. 11, 2001

(65) Prior Publication Data

US 2003/0159039 A1    Aug. 21, 2003

(30) Foreign Application Priority Data

Mar. 30, 2000    (FR)    ................................ 00 04313

(51) Int. Cl.
*H04L 9/00*    (2006.01)
(52) U.S. Cl. ........................ 713/159; 713/201; 713/170
(58) Field of Classification Search ................ 713/159, 713/201, 170
See application file for complete search history.

(56) References Cited

U.S. PATENT DOCUMENTS 5,128,997 A    7/1992    Pailles ......................... 380/23

(Continued)

FOREIGN PATENT DOCUMENTS

DE    4138861    10/1992

(Continued)

OTHER PUBLICATIONS

Henri Gilbert, "Techniques for Low Cost Authentication and Message Authentication", Proceedings of the CARDIS '98 Conference.

*Primary Examiner*—Emmanuel L. Moise
*Assistant Examiner*—Techane J. Gergiso
(74) *Attorney, Agent, or Firm*—Cohen Pontani Lieberman & Pavane LLP

(57) ABSTRACT

The present invention relates to a method of protecting an electronic chip (1) of a user against fraud in transactions between an application (2) and the electronic chip (1).

The method consists in:
  both the electronic chip (1) and the application (2) computing (16, 17) a certificate (Sp, S) which is the result of applying the logic function g to a list of arguments ($e_1$, $e_2$) comprising at least the seed R and the secret key K,
  allocating to the electronic chip (1) a second secret key K' known only to the electronic chip (1) and to the application (2) and kept secret (13) in the electronic chip (1),
  on each authentication of the electronic chip (1), determining (18, 19) a mask M computed by applying a non-linear function f to at least a portion of the secret key K',
  masking (20) the value of the certificate (Sp) by means of the mask M to make available to the application (2) only the masked value of the certificate (Spm), and
  using the application (2) to verify the masked value of the certificate (Spm) computed by the electronic chip (1).

30 Claims, 1 Drawing Sheet

U.S. PATENT DOCUMENTS

| | | | |
|---|---|---|---|
| 5,201,000 A * | 4/1993 | Matyas et al. | 380/30 |
| 5,225,664 A * | 7/1993 | Iijima | 235/380 |
| 5,862,224 A | 1/1999 | Gilbert | 380/28 |
| 6,058,476 A * | 5/2000 | Matsuzaki et al. | 713/169 |
| 6,073,236 A * | 6/2000 | Kusakabe et al. | 713/169 |
| 6,240,517 B1 * | 5/2001 | Nishioka | 726/20 |
| 6,647,493 B1 * | 11/2003 | Occhipinti et al. | 713/170 |
| 6,892,301 B1 * | 5/2005 | Hansmann et al. | 713/172 |
| 5,761,309 A * | 6/1998 | Ohashi et al. | 713/156 |
| 5,799,085 A * | 8/1998 | Shona | 713/169 |

FOREIGN PATENT DOCUMENTS

| | | |
|---|---|---|
| EP | 0565279 | 10/1993 |
| EP | 0621570 | 10/1994 |
| EP | 827120 A1 * | 3/1998 |
| EP | 957651 A2 * | 11/1999 |
| WO | WO/9722093 | 6/1997 |

* cited by examiner

METHOD OF PROTECTING AN ELECTRONIC CHIP AGAINST FRAUD

This application is a U.S. National Phase Application under 35 USC 371 of International Application PCT/FR01/00810 filed 19 Mar. 2001.

FIELD OF THE INVENTION

The present invention relates to a method of protecting an electronic chip of a user against fraud.

The invention has one highly advantageous application in that it provides hardwired logic or microprocessor integrated circuit chips with protection against fraud, especially the chips incorporated in prepaid cards used in diverse transactions such as paying for telephone calls, for articles from automatic dispensers, for parking at parking meters, or for services such as public transport or infrastructure services (tolls, museum charges, library fees, etc.).

DESCRIPTION OF THE PRIOR ART

At present, prepaid cards are open to various types of fraud. A first type of fraud consists in unauthorized duplication of the card, often referred to as cloning. A second type of fraud consists in modifying the data associated with a card, in particular the amount of credit stored in the card. Cryptography is used to combat those kinds of fraud, both by authenticating the card and/or the data by means of a digital signature and also by encrypting the data to ensure confidentiality. Cryptography uses two entities, namely a verifier and an object to be verified, and can be either symmetrical or asymmetrical. When it is symmetrical, the two entities share exactly the same information, in particular a secret key. When it is asymmetrical, one of the two entities has a pair of keys, one of which is secret and the other of which is public; there is no shared secret key. In many systems only symmetrical cryptography is used for prepaid cards because asymmetrical cryptography is as yet slow and costly. The first authentication mechanisms developed for symmetrical cryptography compute a certificate once and for all, which certificate is different for each card, store it in the memory of the card, read it on the occasion of each transaction, and verify it by interrogating an application of the network supporting the transaction and which has certificates that have already been allocated stored therein. Those mechanisms provide insufficient protection. The certificate can be misappropriated, reproduced and replayed fraudulently, since it is always the same for a given card. To take account of the small number of authentications effected between two recharging operations in the case of a rechargeable prepaid card, or during the service life of a non-rechargeable prepaid card, such passive authentication mechanisms are replaced by or complemented with mechanisms that use a secret key for the purpose of authenticating or acknowledging an instruction and/or for the purpose of authenticating data. The secret key, which is different for each card, and initially written into the card, or rewritten into the card when recharging a rechargeable card, is used by the card itself to compute a certificate at the time of each authentication.

A first of those mechanisms is the subject matter of U.S. Pat. No. 5,128,997. The method described therein consists in determining a non-linear function which is known to the application and installed in an electronic chip in the form of a state automaton. When performing an authentication, the electronic chip and the application compute a certificate which is the result of applying the function to a list of arguments determined on each authentication; the list of arguments can include a random seed which is a data item determined by the application on each authentication, a data item contained in the electronic chip, and a secret key known to the electronic chip and to the application. If the certificate computed by the electronic chip is identical to the certificate computed by the application, the electronic chip is deemed to be authentic and the transaction between the electronic chip and the application is authorized.

A second mechanism for protecting cards by active authentication, using a logic function based on the use of an authentication code ensuring unconditional security for a limited number of authentications, is the subject matter of U.S. Pat. No. 5,862,224, and is also described in the paper "Solutions for Low Cost Authentication and Message Authentication" published in the Proceedings of the CARDIS'98 Conference. The use of this kind of logic function ensures protection against replaying and controlled wear of the secret key. In applications based on the memory card considered in the present patent, a linear logic function depending on a secret key and parameters such as the seed received by the card and where applicable data internal to the card or received by the card can advantageously be used. The family of logic functions described in U.S. Pat. No. 5,862,224 constitutes one particular case that is particularly suited to the constraints of synchronous cards employing modulo 2 scalar product of binary vector computations.

Each of the two above-cited mechanisms has its own advantages and disadvantages. With regard to the first mechanism, which is based on the assumption that the non-linear function used is secure (which cannot be proved in the current state of knowledge), the very severe constraints imposed by the limited computation capacity of hardwired logic chips do not afford a safety margin that is as wide as that for the usual secret key algorithms, and disclosure of the detailed specification of the non-linear function used can therefore represent a risk. With regard to the second mechanism, it has the advantage of proven security provided that the number of authentications does not exceed a particular threshold, and there is therefore no risk associated with disclosure of the linear function used; however, the necessity for a strict limit on the number of uses of the authentication function over the service life of the chip (or between two recharging operations in the case of rechargeable cards), which limitation is inherent to the second solution, can represent a constraint that is difficult to satisfy in some applications. Additionally, attacking the security modules used to verify the hardwired logic chips, instead of attacking the chips themselves, by means of a procedure whereby random responses are fed to the verification modules until a sufficient number of good responses is obtained by chance, thereby revealing to the perpetrator of the fraud the secret associated with a card number of his choice, may be more difficult to counter in the case of the second mechanism.

SUMMARY OF THE INVENTION

Accordingly, the technical problem to be solved by the subject matter of the present invention is that of proposing a method of protecting an electronic chip of a user against fraud, which method comprises the following steps:

determining a logic function g known to the application and implanted in the electronic chip, allocating to the electronic chip a first secret key K, known only to the electronic chip and to the application, and kept secret in the electronic chip, on each authentication of the electronic chip, generating a variable input word R referred to as a random seed, computing by both the electronic chip and the application a certificate which is the result of applying the logic function g to a list of arguments comprising at least the seed R and the secret key K, and which enhances security.

According to the present invention, a solution to the technical problem stated is that said method further comprises the following steps:

determining a non-linear function f known to the application and implanted in the electronic chip, allocating to the electronic chip a second secret key K' known only to the electronic chip and to the application and kept secret in the electronic chip, on each authentication of the electronic chip, determining a mask M by applying the non-linear function f to a list of arguments comprising at least a portion of the secret key K', masking the value of the certificate by means of the mask M to make available to the application only the masked value of the certificate, and using the application to verify the masked value of the certificate computed by the electronic chip.

Thus the method according to the invention, which concerns protecting an electronic chip against fraud in transactions between an electronic chip and an application, masks the value of the certificate S computed by the electronic chip before the application reads it to verify its value and authenticate the electronic chip; computing the certificate S and determining the mask M respectively employ a logic function depending on a first key implanted in the electronic chip and a non-linear function depending on a second key, also implanted in the electronic chip, the functions and the keys being known to the application.

The method of the invention solves the stated problem because the value of the certificate S, computed by the electronic chip, is not available in clear but in a masked form. Consequently, in the event of fraud, the perpetrator cannot simply intercept the computed result exchanged between the electronic chip and the application and replay it subsequently. The perpetrator needs to know the value of the logic function and of the first key for computing the certificate and the values of the non-linear function and the second key which are used to determine the mask.

The application verifies the accuracy of the masked value either by using the mask M to mask the value of the certificate (once both the mask M and the certificate S have been computed) and then comparing the masked value with the value computed by the electronic chip, or else by unmasking the masked certificate computed by the electronic chip by means of a function that is the inverse of the masking function and comparing the unmasked value with the value of the certificate computed by the application. If the values compared are identical, the electronic chip is deemed to be authentic and the transaction between the chip and the application is authorized.

One particular embodiment has the advantage that it simultaneously authenticates the card and authenticates data by using the value of some of the data when computing the certificate. In a first case, this data may be stored in memory in the electronic chip and may consist of the number of the electronic chip or of a credit associated with the electronic chip. In a second case, this data is written into the electronic chip by the application during the authentication operation.

Although it is preferable to use independent keys K and K', there may exist a dependency link in the form of a function for computing the key K' from the key K. The keys are allocated to an electronic chip either while customizing the chip at the end of its manufacturing process or while recharging the electronic chip in the case of a rechargeable electronic chip.

In another particular embodiment, the keys K and K' can be determined by applying a diversification method whose input arguments are the number of the electronic chip and a master secret code, which has the advantage that the application can reconstitute the secret keys of each electronic chip after reading the number of the chip; it is not necessary to store the secret keys of the chips.

In a further particular embodiment, the key K is a word comprising a particular number of bits grouped in sequences $K[i]$. Each sequence $K[i]$ comprises a number of bits equal to the number of bits of the input arguments other than the key K and taken as a whole, and the logic function g consists in effecting modulo 2 scalar products between each of the bits of a particular sequence $K[i]$ and the bits of the input arguments other than the key K.

The non-linear function f can have as input arguments the key K', the seed R, data D internal to the electronic chip, or data D' supplied to the electronic chip by the application, or a combination of the above; each argument adds a further obstacle to be overcome by the perpetrator of a fraud.

In another particular embodiment the seed R is determined by the application on the basis of a random number generated by the application, and the seed R is transmitted to the electronic chip by the application.

In another particular embodiment the seed R is determined from a series of consecutive integers generated by the application (2) and by the electronic chip.

In another particular embodiment the non-linear function f further has as input arguments at least one parameter c depending on the state of the electronic chip at the time of authentication. In a first variant of this embodiment the value of the parameter c is computed from at least the value of a counter in the electronic chip which is incremented on each authentication. In a second variant of this embodiment the value of the parameter c is computed from at least the seed R and the value of a counter in the electronic chip which is incremented on each authentication.

In another particular embodiment, the masking of the certificate by means of the mask M is computed by means of an encryption function, in particular by an exclusive-OR operation applied bit by bit.

In another particular embodiment, the number of authentications of the electronic chip is limited to a maximum value V determined by the application and written into the electronic chip. In one variant of this embodiment, the electronic chip contains a counter which is incremented on each authentication and the electronic chip terminates all authentication computation if the value of the counter reaches the maximum value V.

BRIEF DESCRIPTION OF THE DRAWINGS

Other features and advantages of the invention become apparent in the following description of particular embodiments of the invention, which description is given with reference to the accompanying drawings, which are provided by way of non-limiting example.

DESCRIPTION OF AN EMBODIMENT

Figure 1:
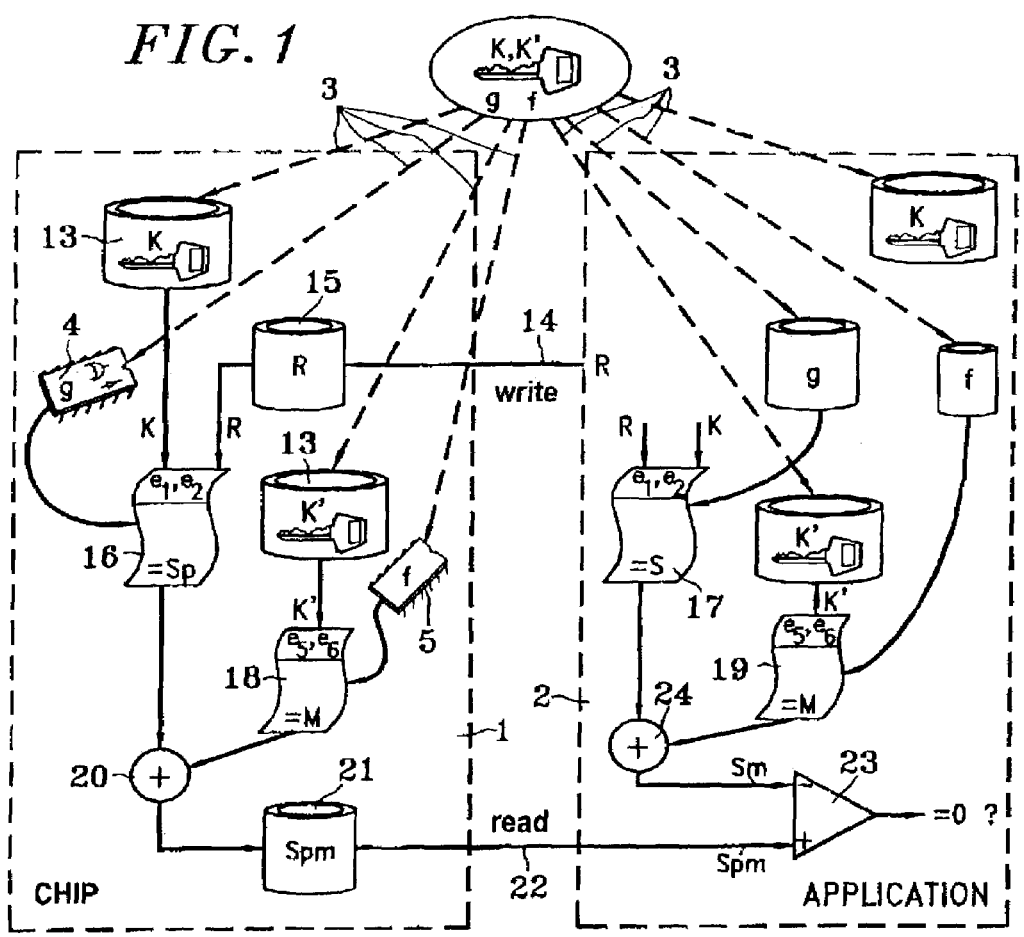
FIG. 1 is a block diagram representing a method of the invention.

FIG. 1 is a diagram showing a method of the invention for protecting an electronic chip 1 of a user against fraud in transactions between an application 2 and the electronic chip 1.

The application 2 can be entirely or partly located in a non-supervised self-service terminal, such as a public telephone or a turnstile controlling access to a public transport facility. The user holds an electronic chip 1, which is implanted in a prepaid card, for example, which enables the user to set up a transaction with the application 2. These transactions can consist of paying for telephone calls, for articles from an automatic dispenser, for parking at a parking meter, or for a service such as a public transport or an infrastructure service.

The method authenticates the electronic chip 1. The electronic chip 1 is customized at the time of its manufacture, and where applicable when recharging it, by means of an identification number i and an initial value of a data item D tied to the application 2 for which the chip is intended; the value D generally represents a credit assigned to the electronic chip 1 for a given application 2.

The method consists in determining the initial conditions necessary for authenticating either the electronic chip 1 or the application 2, either during customization or during some other operation prior to selling the electronic chip to the user. These initial conditions involve determining (3) a logic function g, a non-linear function f, a first secret key K and second secret key K'. The logic function g is known to the application 2 and is implanted in the electronic chip 1 in the form of electronic circuits 4 such as OR, exclusive-OR, AND, NAND, etc. circuits.

Figure 2:
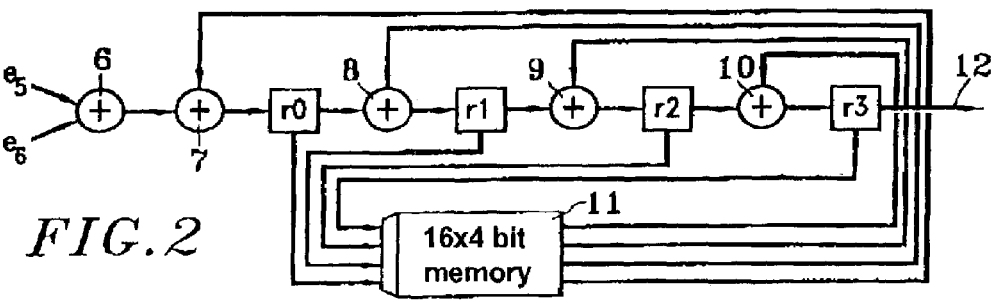
FIG. 2 is a block diagram representing a non-linear function f.

The non-linear function f can be implanted in the form of a circuit 5 taking the form of a succession of registers forming a shift register and associated with a memory and with exclusive-OR operators; this kind of function is referred to as a "state automaton", and one example of this kind of function is shown in FIG. 2. In this example, the function f consists of a first exclusive-OR operator 6, a 4-bit shift register comprising four flip-flops r0 to r3 and four exclusive-OR operators 7 to 10, and a memory 11 with a size of 16×4 bits. Each exclusive-OR operator 6 to 10 has two inputs and one output. Each flip-flop r0 to r3 has one data input, two data outputs and a clock input, not shown. The memory 11 has four inputs and four outputs and a clock input, not shown. The input arguments $e_5$, $e_6$ comprise, in this embodiment, at least a portion of the second secret key K' and the random seed R, which are present at one of the inputs of the first exclusive-OR operator 6. The output of the first exclusive-OR operator 6 is connected to the first input of the second exclusive-OR operator 7. The input of each of the flip-flops r0, r1, r2, and r3 is connected to the output of an exclusive-OR operator 7 to 10. A first output of each of the flip-flops r0, r1, and r2 is connected to a first input of an exclusive-OR operator 8 to 10. A second output of each of the flip-flops r0, r1, r2, and r3 is connected to an input of the memory 11. A second input of each of the exclusive-OR operators 7 to 10 is connected to an output of the memory 11. The first output of the flip-flop r3 gives the value of the mask M computed by applying the function f to the arguments $e_5$, $e_6$ which, in this embodiment, comprise at least a portion of the second secret key K' and the seed R. To each authentication of the electronic chip 1 or of the application 2 there corresponds a number of clock pulses equal to the number of bits of the input arguments; the bits of the mask M are fed out serially to the output 12 on each clock pulse.

The first key K, which is generally allocated individually to an electronic chip 1, typically consists of a word comprising a few tens of bits to a few thousand bits; this word is known to the application 2 and is kept secret in the electronic chip 1. Nevertheless, in one particular embodiment of the method, the application 2 does not store the key K itself, but instead stores a master secret. This master secret enables the key K to be reconstituted from the identification number i of the chip by a so-called diversification method.

Whichever embodiment of the method is used, the key K is typically held in the chip in a read-only memory 13 such as a PROM. In particular, if the electronic chip 1 is rechargeable, which is the case for an electronic chip 1 implanted in a rechargeable prepaid card, the read-only memory is a memory that can also be written, such as an EEPROM.

Like the key K, the second key K' takes the form of a word with a particular number of bits. The keys K and K' are stored in the chip, typically in the same memory 13 at different addresses, but in some cases the determination of the bits of K' can depend on the key K, or those of K can depend on K'.

After the customization operation, the electronic chip 1 is sold to the user, who can enter into a transaction with an application 2. The authentication process entails authentication of the electronic chip 1 by the application 2, as shown in the FIG. 1 diagram.

In a first step of the method, the application generates a word R referred to as a random seed. The word R comprises a number of bits determined to prevent any attempt at fraudulent replaying; the number of bits is typically of the order of a few tens of bits. The word R is generated by a random generator or a pseudo-random generator. In one particular embodiment, the successively generated words R can consist of a series of consecutive integers. The word R is an input argument for computation of the certificate S. For the electronic chip 1 to have access to the word R, either the application 2 performs a write operation 14 in the chip 1 or the chip 1 reads the word R in the application 2. Communication between the chip 1 and the application 2 can conform to a protocol established when customizing the chip 1; the value R can be encoded, for example. The word R is stored temporarily in a buffer memory 15 of the electronic chip 1 and in the application 2.

In a second step of the method, both the application 2 and the chip 1 compute (16, 17) respective certificates S and Sp. The certificate S, or Sp as the case may be, is the result of the computation effected by applying the logic function g to a list of arguments $e_1$, $e_2$ which comprise at least the seed R and the key K. In particular embodiments of the method, the list of arguments $e_1$, $e_2$ further comprises the identification number i of the electronic chip 1, one or more data items D contained in the electronic chip 1, one or more data items D' generated by the application and written into the electronic chip 1 prior to authentication, or a combination of the above arguments.

In a third step, the method determines (18, 19) a mask M by means of the non-linear function f. The mask M is the result of applying the non-linear function f to a list of arguments e5, e6 as described above with reference to FIG. 2. The mask M comprises a particular number m of bits, which number is typically equal to around ten bits. The embodiment in which the number m is the same as the number of bits in the certificate S has the advantage that the masked certificate does not reveal any information on the certificate S; this is not the case if the length m of the mask M is shorter than the length of the certificate S.

In a fourth step of the method, the electronic chip 1 masks (20) the value of the certificate Sp that it has computed by means of the mask M. In a first embodiment, the masking step 20 uses an encryption function. An encryption function is a one-to-one function whose parameters are set by a key which matches one set of values to another set of values; for example the function F: x→x+k modulo 2, where x=0 or 1 and k=0 or 1, can be used as the encryption function. The encryption function can consist of an exclusive-OR operation between the certificate Sp and the mask M. The result of the masking operation is the masked value of the certificate Spm which is stored temporarily in a buffer memory 21 of the electronic chip 1.

In a fifth step of the method, the application reads (22) the buffer memory 21 or the electronic chip 1 writes the masked certificate Spm into the application 2. Communication between the electronic chip 1 and the application 2 can conform to a protocol similar to that used to communicate the seed R. The application 2 then verifies the masked value of the certificate Spm computed by the chip 1 by comparing it (23) to the value S of the certificate that it has itself computed. To effect the comparison step 23, either the application 2 masks (24) the value S of the certificate by means of the mask M to obtain a masked value Sm and to compare it (23) with the value Spm, as shown here, or the application 2 unmasks the value Spm using a function which is the inverse of the masking function M to obtain the value Sp and compare it with the value S.

A variant of the method described above with reference to FIGS. 1 and 2 advantageously remedies certain attempts at fraud by simulating the behavior of an application relative to a chip by means of authentication of the application by the electronic chip. In this variant, operations previously effected by the application are effected by the electronic chip and vice-versa. Accordingly:

on each authentication of the application, the variable input word R referred as a seed is generated, preferably by the electronic chip, the application computes a certificate and masks it by means of the mask M to make available to the electronic chip only the masked value of the certificate, and the operation of comparing certificate values computed firstly by the electronic chip, and secondly by the application, is effected by the electronic chip.

The invention further provides an electronic chip intended for transactions with an application, the transactions using a method of the invention. The chip comprises:

a non-volatile memory such as a PROM or an EEPROM for storing the first secret key K and the second secret key K', a first electronic circuit such as a microprocessor or a programmable logic circuit (EPLD or PAL) for computing the certificate Sp and for computing the mask M, integrated circuits in which are implanted the logic function g and the non-linear function f, and a second electronic circuit such as a microprocessor or a programmable logic circuit (EPLD or PAL) for masking the certificate with the mask M.

The invention further provides a prepaid card incorporating the above kind of electronic chip.

The invention further provides a device intended for transactions with such electronic chips, the transactions using a method of the invention. The device includes:

memory means for storing the secret keys K, K' of the electronic chips, the logic function g and the non-linear function f, computation means for computing the certificate S and for computing the mask M, and verification means for verifying the masked value of the certificate Spm computed by an electronic chip.

The device is incorporated into equipment such as a public telephone, a point of access to a public service (an underground railway access turnstile, a library access turnstile, etc.), or a parking meter.

The invention claimed is:

1. A method of protecting an electronic chip (1) of a user against fraud in transactions between an application (2) and the electronic chip (1), the method comprising the following steps:

determining (3) a combinatorial logic function g known to the application (2) and implanted (4) in the electronic chip (1), allocating to the electronic chip (1) a first secret key K, known only to the electronic chip (1) and to the application (2), and kept secret (13) in the electronic chip (1), on each authentication of the electronic chip (1), generating a variable input word R referred to as a seed, computing (16, 17) by both the electronic chip (1) and the application (2) a certificate (Sp, S) which is the result of applying the combinatorial logic function g to a list of arguments ($e_1$, $e_2$) comprising at least the random seed R and the secret key K, determining a non-linear pseudo-random function f known to the application (2) and implanted in the electronic chip (1), allocating to the electronic chip (1) a second secret key K' known only to the electronic chip (1) and to the application (2) and kept secret (13) in the electronic chip (1), on each authentication of the electronic chip (1), determining (18, 19) a mask M by applying the non-linear pseudo-random function f to a list of arguments ($e_5$, $e_6$) comprising at least a portion of the secret key K', masking (20) the value of the certificate (Sp) by means of the mask M to make available to the application (2) only the masked value of the certificate (Spm), and using the application (2) to verify the masked value of the certificate (Spm) computed by the electronic chip (1).

2. A method according to claim 1, wherein verification by the application (2) of the masked value of the certificate (Spm) computed by the electronic chip (1) comprises:

using the mask M to unmask the masked value of the certificate (Spm) computed by the electronic chip (1), and comparing the value of the certificate (Sp) computed by the electronic chip (1) with that (S) computed by the application (2).

3. A method according to claim 1, wherein verification by the application (2) of the masked value of the certificate (Spm) computed by the electronic chip (1) comprises:

using the mask M to mask (24) the value of the certificate (S) computed by the application (2), and comparing (23) the masked value of the certificate (Sp) computed by the electronic chip (1) with the masked value of the certificate (Sm) computed by the application (2).

4. A method according to claim 1, wherein the masking (20, 24) of the certificate (Sp, S) by means of the mask M is computed by means of an encryption function.

5. A method according to claim 4, wherein the encryption function is an exclusive-OR operation applied bit by bit.

6. A method according to claim 1, wherein the seed R is determined by the application (2) from a random number generated by the application (2) and in that the seed R is transmitted to the electronic chip (1) by the application (2).

7. A method according to claim 1, wherein the seed R is determined from a series of consecutive integers generated by the application (2) and by the electronic chip (1).

8. A method according to claim 1, wherein the certificate (Sp, S) and the mask M have the same number of bits.

9. A method according to claim 1, wherein the certificate (Sp, S) is the result of applying the combinatorial logic function g to a list of arguments ($e_1, e_2$) comprising at least the seed R, the secret key K, and data D internal to the electronic chip (1).

10. A method according to claim 1, wherein the certificate (Sp, S) is the result of applying the combinatorial logic function g to a list of arguments ($e_1, e_2$) comprising at least the seed R, the secret key K, and data D' supplied to the electronic chip (1) by the application (2) at the time of authentication.

11. A method according to claim 1, wherein the secret key K comprises a sequence of values Ki and the combinatorial logic function g determining the value of the certificate (Sp, S) comprises computing modulo 2 scalar products of each of the values Ki and the input arguments other than the key K of the combinatorial logic function g.

12. A method according to claim 1, wherein the secret keys K and K' are chosen independently of each other.

13. A method according to claim 1, wherein the non-linear pseudo-random function f further has as input arguments at least the seed R.

14. A method according to claim 1, wherein the non-linear pseudo-random function f further has as input arguments ($e_5, e_6$) at least data D internal to the electronic chip.

15. A method according to claim 14, wherein the electronic chip (1) contains a counter which is incremented on each authentication and in that the electronic chip (1) terminates all authentication computation if the value of the counter reaches the maximum value V.

16. A method according to claim 1, wherein the non-linear pseudo-random function f further has as input arguments ($e_5, e_6$) at least data D' supplied to the electronic chip (1) by the application (2).

17. A method according to claim 1, wherein the non-linear pseudo-random function f further has as input arguments ($e_5, e_6$) at least one parameter c depending on the state of the electronic chip (1) at the time of authentication.

18. A method according to claim 17, wherein the value of the parameter c is computed from at least the value of a counter in the electronic chip (1) which is incremented on each authentication.

19. A method according to claim 17, wherein the value of the parameter c is computed from at least the seed R and the value of a counter in the electronic chip (1) which is incremented on each authentication.

20. A method according to claim 1, wherein the number of authentications of the electronic chip (1) is limited to a maximum value V determined by the application (2) and written into the electronic chip (1).

21. An electronic chip (1) intended for transactions with an application (2), the transactions using a method according to claim 1, which electronic chip comprises:
    memory means (13) for storing the first secret key K and the second secret key K',
    computation means (16, 18) for computing the certificate (Sp) and for computing the mask M,
    electronic means (4, 5) in which are implanted the combinatorial logic function g and the non-linear pseudo-random function f and masking means (20) for masking the certificate with the mask M.

22. An electronic chip (1) according to claim 21, comprising:
    means for counting the number of authentications of the electronic chip (1) for a given application (2) in order to monitor the duration of use of the electronic chip (1).

23. A prepaid card including an electronic chip (1) according to claim 21.

24. A device intended for transactions with electronic chips (1), the transactions using a method according to claim 1, which device comprises:
    memory means for storing the secret keys K, K' of the electronic chips, the combinatorial logic function g and the non-linear pseudo-random function f,
    computation means for computing the certificate (S) and for computing the mask M, and
    verification means for verifying the masked value of the certificate (Spm) computed by an electronic chip (1).

25. A public telephone incorporating a device according to claim 24.

26. A point of access to a public service incorporating a device according to claim 24.

27. A parking meter incorporating a device according to claim 24.

28. A method of protecting an electronic chip (1) of an user against fraud in transactions between an application (2) and the electronic chip (1), the method comprising the following steps:
    determining a combinatorial logic function g known to the application (2) and implanted (4) in the electronic chip (1),
    allocating to the electronic chip (1) a first secret key K, known only to the electronic chip (1) and to the application (2), and kept secret (13) in the electronic chip (1),
    on each authentication of the application (2), generating an input word R referred to as a random seed,
    computing by both the electronic chip (1) and the application (2) a certificate (Sp, S) which is the result of applying the combinatorial logic function g to a list of arguments ($e_1, e_2$) comprising at least the seed R and the secret key K,
    which method is characterized in that it further comprises the following steps:
    determining a non-linear pseudo-random function f known to the application (2) and implanted in the electronic chip (1),
    allocating to the electronic chip (1) a second secret key K' known only to the electronic chip (1) and to the application (2) and kept secret (13) in the electronic chip (1),
    on each authentication of the application (2), determining (18, 19) a mask M computed by applying the non-linear pseudo-random function f to at least a portion of the secret key K',
    masking the value of the certificate (S) by means of the mask M to make available to the electronic chip (1) only the masked value of the certificate (Sm), and
    using the electronic chip (1) to verify the masked value of the certificate (Sm) computed by the application (2).

29. A method according to claim 28, wherein the seed R is determined by the electronic chip (1) from a random number generated by the electronic chip (1) and the seed R is transmitted to the application (2) by the electronic chip (1).

30. A method according to claim 28, wherein the seed R is determined from a series of consecutive integers generated by the application (2) and by the electronic chip (1).

* * * * *